Oct. 10, 1967
F. E. G. BOURQUARD
3,346,065
MEASUREMENT APPARATUS FOR STUDYING THE
PHYSICAL PROPERTIES OF A MEDIUM
Filed Oct. 4, 1965
2 Sheets-Sheet 1
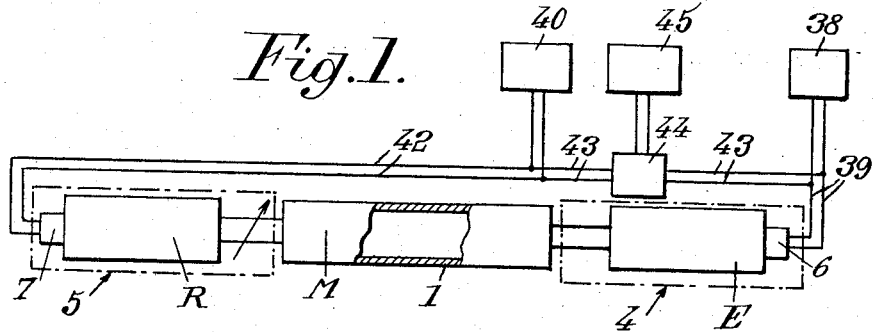
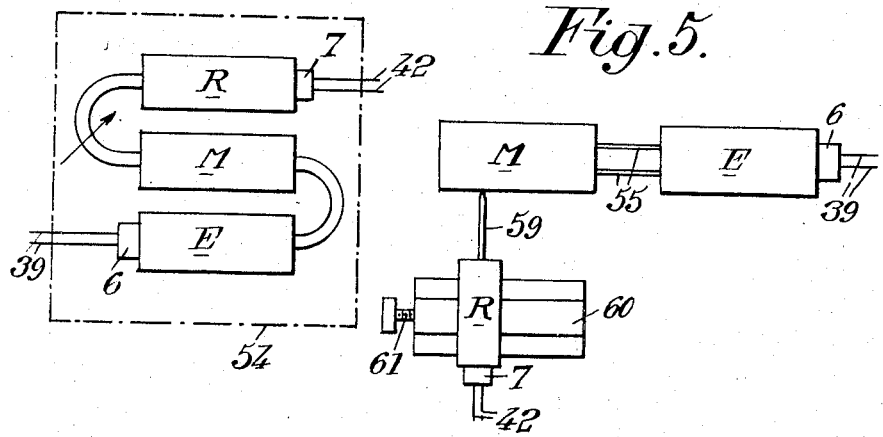
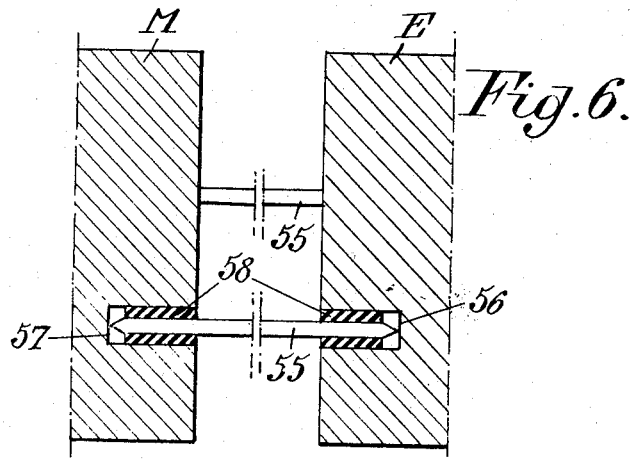

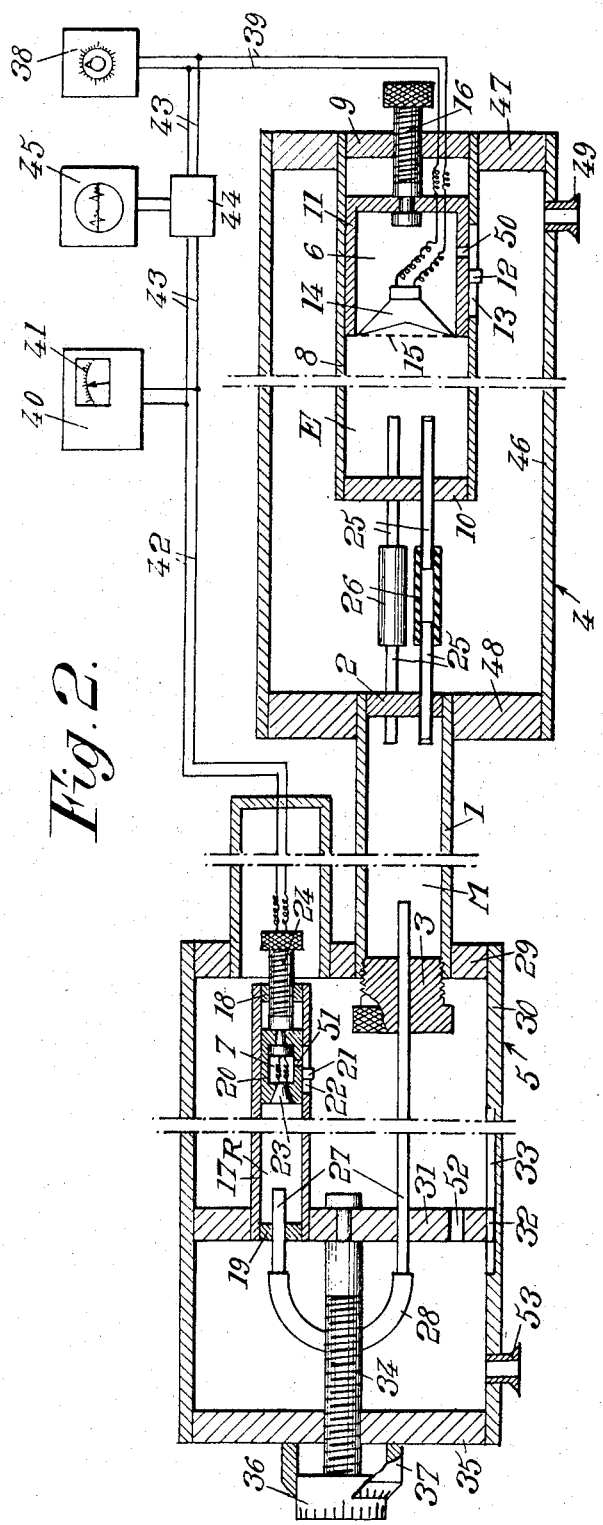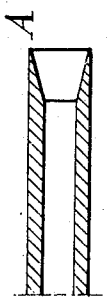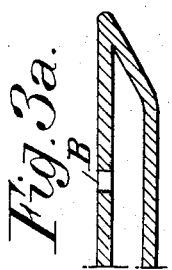

United States Patent Office 3,346,065
Patented Oct. 10, 1967

3,346,065
MEASUREMENT APPARATUS FOR STUDYING
THE PHYSICAL PROPERTIES OF A MEDIUM
Fernand Eugene Gabriel Bourquard, 13 Rue Cantin,
Courbevoie, France
Filed Oct. 4, 1965, Ser. No. 492,658
Claims priority, application France, Oct. 7, 1964,
990,660
20 Claims. (Cl. 181—.5)

The apparatus includes a measurement resonator, a transmitter resonator provided with an acoustic wave transmitter, and a receiver resonator provided with an acoustic wave receiver. Coupling between the transmitter resonator and the measurement resonator is ensured through three tubular conduits whereas coupling between the measurement resonator and the receiver resonator is ensured through one tubular conduit. The three resonators may be tuned together and it is then possible to proceed to the acoustic scanning of the measurement resonator by displacing a piston which supports both the receiver resonator and the last mentioned tubular conduit. From this scanning is deduced the length of the acoustic waves travelling through the measurement resonator, which permits of calculating the velocity of sound in the fluid contained in the apparatus.

The present invention relates to measurement apparatus utilizing the propagation of acoustic waves in the mediums to be studied, such apparatus serving to study the physical properties (temperature, pressure, concentration, percentage of moisture, rate of purity, and so on) of gaseous, liquid or solid mediums, by analyzing the propagation of acoustic waves in said mediums.

The chief object of the present invention is to provide an apparatus of the above mentioned kind which is better adapted to meet the requirements of practice than those used up to now for the same purposes, in particular concerning sensitivity, stability, and fineness of measurement.

The invention relates to apparatus wherein a sample to be studied is acoustically insulated so as to act as an acoustic resonator, hereinafter called "measurement resonator," and the respective ends of said sample are connected with an acoustic wave transmitter device and an acoustic wave receiver device.

According to the present invention, at least one of said last mentioned devices consists of a resonator provided, when said device is the transmitter with an acoustic wave transmitter or, when it is the receiver, with an acoustic wave receiver (said last mentioned resonator being therefore hereinafter called, according as the case may be, "transmitter resonator" or "receiver resonator"), a weak acoustic coupling, preferably adjustable, being provided between the measurement resonator and either the transmitter resonator or the receiver resonator as the case may be, possibly with both.

Preferred embodiments of the present invention will be hereinafter described with reference to the appended drawings, given merely by way of example, and in which:

FIG. 1 diagrammatically shows an analyzer apparatus made according to a first embodiment of the invention;

FIG. 2 is a longitudinal section showing on a larger scale an analyzer apparatus analogous to that diagrammatically shown by FIG. 1;

FIGS. 3 and 3a are two enlarged sections illustrating two embodiments of an element of the apparatus of FIG. 2;

FIG. 4 diagrammatically shows a modification of the measurement apparatus of FIG. 1;

FIG. 5 is a diagrammatical view of a measurement apparatus made according to still another embodiment of the invention;

FIG. 6 is a sectional view on an enlarged scale of a portion of the apparatus of FIG. 5.

The measurement apparatus comprises a measurement resonator M containing a gaseous fluid to be studied. In the embodiment illustrated by FIGS. 1 and 2, this measurement resonator consists of a cylindrical tube 1 closed at both ends by end walls 2 and 3. At least one of these end walls, to wit 3, is mounted on tube 1 through screw threads which permit of adjusting the position of said end wall 3 with respect to said tube 1.

Means, which will be hereinafter more explicitly referred to, are provided for introducing the gaseous fluid to be studied into tube 1.

The respective ends of tube 1 are provided, on the one hand, with an acoustic wave transmitter device 4, and on the other hand, with an acoustic wave receiver device 5.

According to the present invention, at least one of the two last mentioned devices, i.e. either device 4 or device 5, or possibly both, is, or are, constituted by a resonator provided, for transmitter device 4, with an acoustic wave transmitter 6 (transmitter resonator E), or, for receiver device 5, with an acoustic wave receiver 7 (receiver resonator R), and a weak acoustic coupling, preferably adjustable, is provided either between measurement resonator M and transmitter resonator E, or between measurement resonator M and receiver resonator R, or again between M and E and between M and R.

Preferably, as shown by FIGS. 1 and 2:

transmitter device 4 consists of transmitter resonator E provided with its acoustic wave transmitter 6, and receiver device 5 consists of receiver resonator R provided with its acoustic wave receiver 7.

An acoustic coupling is provided, on the one hand, between transmitter resonator E and measurement resonator M, and, on the other hand, between measurement resonator M and receiver resonator R.

Transmitter resonator E comprises, as shown by FIG. 2, a cylindrical tube 8 closed at its respective ends by end walls 9 and 10, at least one of which is removable.

The acoustic wave transmitter 6 is mounted in tube 8 and comprises the following elements:

(a) A tubular support 11 slidable in tube 8 but prevented from rotating with respect thereto by a lug 12 cooperating with a slot 13 provided in the wall of tube 8, (b) A loud speaker 14 provided with a thin perforated plate 15, the whole being fixed on the open end of tubular support 11, and (c) Means for ensuring sliding displacement of transmitter 6 (comprising loud speaker 14 mounted in tubular support 11) in tube 8, said means consisting of a screw 16 cooperating, on the one hand, with the end wall 9 of tube 8 (provided with a screw threaded hole), and, on the other hand, with the closed end of tubular support 11.

Receiver resonator R consists, in the embodiment illustrated by FIG. 2, of a cylindrical tube 17 provided at its respective ends with end walls 18 and 19 at least one of which is removable.

Acoustic wave receiver 7 is mounted in tube 17 and this receiver comprises:

(d) A tubular support 20 slidable in tube 17 but prevented from rotating therein by a lug 21 cooperating with a slot 22 provided in a wall of said tube 17;

(e) A microphone 23 carried by the open end of tubular support 20, and (f) Means for ensuring a sliding displacement of receiver 7, such means consisting of a screw 24 cooperating, on the one hand, with the end wall 18 of tube 17 (in which end wall there is provided a threaded hole to accommodate said screw), and, on the other hand, with the closed end wall of tubular support 20.

Concerning the ascoustic coupling between transmitter resonator E and measurement resonator M, it is performed by three tubular conduits 25 interposed between resonator E and resonator M. Said tubular conduits 25 extend into the inside of tube 8 and into the inside of tube 1.

These tubular conduits 25 (only two of which are visible on FIG. 2) include, in their middle portion, flexible parts 26, for instance of rubber or an equivalent plastic material. Said flexible parts 26 have a double function:

On the one hand, they insulate, from the point of view of mechanical vibrations, resonator E and resonator M from each other.

On the other hand, they make is possible to modify the coupling by engaging more or less tubular conduits 25 into resonator E and/or into resonator M, said conduits 25 being slidable in end walls 10 and 2.

As for the ascoustic coupling between measurement resonator M and receiver resonator R it is similar but with a single tubular conduit 27 interposed between said resonators.

This tubular conduit 27 comprises, in its middle portion, a flexible part 28 of rubber or an equivalent plastic material. This flexible part 28 has three functions:

First, it prevents the transmission of mechanical vibrations from resonator M to resonator R.

Secondly, it permits of modifying the coupling by varying the relative position of tubular conduit 27 with respect to resonators M and R, the respective portions of conduit 27 that engage into said resonators being slidable in the end walls of said resonators.

Finally, this arrangement makes tubular conduit 27 sufficiently flexible to permit of bending it at 180°, as shown by FIG. 2, thus reducing the length of the apparatus.

Furthermore, the acoustic coupling between measurement resonator M and receiver resonator R is arranged so as to permit an acoustic scanning of tube 1, which constitutes the measurement resonator M, this scanning being performed by means of a portion of tubular conduit 27 projecting into said tube 1.

For this purpose, measurement resonator M is fixed on one of the end walls 29 of a cylinder 30, resonator M being located on the outside of said cylinder 30 whereas resonator R is on the inside thereof. Resonator R is secured to a piston 31 slidable inside cylinder 30.

Piston 31, on which is also fixed the portion of tubular conduit 27 which serves to scan measurement resonator M, is prevented from rotating in cylinder 30 by a projection 32 cooperating with a groove 33 provided in the cylindrical wall of said cylinder 30.

Means are provided for controlling the displacement of piston 31 in cylinder 30 which produces the scanning displacement of the end of tubular conduit 27 in measurement resonator M. Such means consist for instance of a screw 34, preferably a micrometric screw, cooperating, on the one hand, with the other end wall 35 of cylinder 30 (in which wall is provided a threaded hole for said screw), and, on the other hand, with piston 31. A graduated control knob 36 cooperating with an annular scale 37 permits of accurately determining the position of piston 31, and therefore of the end of tubular conduit 27.

The amplitude of displacement of piston 31 must be such that the end of tubular conduit 27 located in tube 1 can move upon practically the whole length of said tube.

Concerning tubular conduits 25 and 27, it is advantageous to give a slightly convergent shape to the ends of tubular conduits 25 that are located in transmitter resonator E and to the ends of tubular conduit 27 that is located in measurement resonator M.

In order to obtain this shape, I may, as shown by FIG. 3, give the inside of the tubular conduit or conduits in question a conical shape as shown at A. The angle of the cone preferably ranges from 5° to 10° and anyway it is such that the edge of the outlet of said conduit is sharp.

I may also, as shown, by FIG. 3a, give a pointed shape to the closed end of the tubular conduit and provide a side hole B in the wall of said conduit, which side hole permits of performing a complementary acoustic scanning.

The electric and electronic means belonging to the measurement apparatus may include, as shown:

a low frequency generator 38 of variable frequency, connected through wires 39 with the loud speaker 14 of the acoustic wave transmitter 6, a low frequency amplifier 40, provided with reading means 41 graduated in current values, said amplifier being connected through wires 42 with the microphone 23 of the acoustic wave receiver 7, and a frequency checking circuit 43, comprising a switch 44 and a two way oscilloscope 45.

Resonator E and tubular conduits 25, are enclosed in a cylindrical shielding casing 46 one of the end walls, 47, of which is fixed with respect to transmitter resonator E whereas the other end wall, 48, is fixed with respect to measurement resonator M.

In a preferred embodiment, the diameter of tube 1 is 30 mm. and the diameter of each of tubular conduits 25 and 27 is 3 mm.

This apparatus works as follows:

First, the fluid constituting the gaseous sample to be studied is introduced into shielding capacity 46 through an inlet 49.

This gas comes to occupy the inside of said capacity 46.

It passes into acoustic wave transmitter 6 through an orifice 50 provided in tubular support 11 opposite slot 13.

It then occupies the inside of transmitter resonator E by flowing through perforated plate 15 and, thence, it passes into measurement resonator M through conduits 25, and into receiver resonator R through conduit 27.

It then passes from the inside of receiver resonator R into the acoustic wave receiver 7 by diffusing through microphone 23.

Finally it passes through an orifice 51 provided in tubular support 20 at the place of slot 22 into cylinder 30 a pressure balance orifice 52 being provided in piston 31.

The fluid flows out through outlet 53.

It is pointed out that the gaseous fluid can be maintained in the measurement apparatus at well determined pressures.

The fluid having been introduced into the apparatus, various adjustments are then performed.

Transmitter resonator E is tuned by acting upon the axial position of the acoustic wave transmitter 6 (control screw 16) and/or upon the distance to which tubular coupling conduits 25 project into said resonator E.

Measurement resonator M is tuned by acting upon the axial position of end wall 3 with respect to tube 1.

Receiver resonator R is tuned by acting upon the axial position of the acoustic wave receiver 7 (control screw 24) and/or upon the distance to which tubular conduit 27 projects into said resonator R.

The measurement proper is then performed by acoustic scanning of measurement resonator M. By displacing through screw 34, piston 31, and therefore the end of tubular conduit 27 located in resonator M, I detect, by making use of the indications of the reading means 41 of low frequency amplifier 40, the position of the pressure nodes or loops in said resonator. It is therefore possible to deduce therefrom the wavelength of the acoustic waves travelling through measurement resonator M, the frequency of said wavelength being known from the indications of low frequency generator 38 and/or of oscilloscope 45.

As the measurement of the distance between the nodes and the loops is performed with a very high accuracy, with an approximation averaging one tenth of a millimeter, and in good conditions of stability, the value of the wavelength that is deduced therefrom is obtained with an accuracy which may be considered as ten times higher than that obtained with the known apparatus used for the same purpose.

Starting from the knowledge of the wavelength and of the frequency of said acoustic waves it is possible to calculate the velocity of sound in the gaseous medium present in measurement resonator M.

Then, after calibration, it is possible to establish a correspondance between the velocity of sound in the gaseous medium that is considered and the temperature of said medium, its percentage of moisture, its rate of purity, its percentage of mixture with another medium and so on.

In the preceding description, it has been supposed that the acoustic waves were of the audible type, that is to say produced by a loud speaker and received by a microphone. Of course, if it is desired to study the physical properties of a medium by analyzing acoustic waves other than those of the audible type, the general construction of the apparatus remains the same as that above described. It suffices to adapt transmitter 6 and receiver 7 to the conditions that are set. For instance, in case of ultra-sonic waves, transmitter 6 and receiver 7 may be of the piezo-electric type or of the electrodynamic type.

Anyway, the choice of wave receiver 7 depends upon the choice of wave transmitter 6.

On the other hand, the acoustic coupling through flexible tubular connections may be used for an arrangement as illustrated by FIG. 4, where the transmitter resonator E, the measurement resonator M, and the receiver resonator R are placed side by side. Such an arrangement is particularly advantageous if the whole of the apparatus is to be placed in an enclosure 54 kept at a fixed temperature. The mechanical controls of the respective resonators may be in this case grouped on the same side of the apparatus, the passages through the wall of enclosure 54 being then grouped together.

Finally, it should be pointed out that if such an apparatus is to be used with liquid fluids, some modifications must be provided among which:

a modification of the acoustic wave transmitter 6 and the acoustic wave receiver 7,
a modification of the acoustic couplings, in particular of the intensity thereof,
a modification of the electric connections, and
a modification of the means for filling up the apparatus.

If it is desired to provide an apparatus according to the present invention for studying a solid medium, I may use the construction diagrammatically illustrated by FIG. 5. In this apparatus, the transmitter resonator E, the measurement resonator M and the receiver resonator R are made in the form of three cylindrical blocks, respectively, the material of which the measurement resonator M is made constituting the sample of the solid medium to be studied.

As in the preceding embodiments, the transmitter resonator E includes an acoustic wave transmitter 6 of any suitable type and the receiver resonator R consists of an acoustic wave receiver 7 of any suitable type corresponding to the acoustic waves supplied by transmitter 6.

Concerning the acoustic coupling between transmitter resonator E and measurement resonator M, it may consist, as shown by FIG. 6, of a plurality of metallic needles 55 having pointed ends which bear against:

the bottoms of bores 56 provided in the cylindrical block constituting the transmitter resonator E, and
the bottoms of bores 57 provided in the cylindrical block constituting the measurement resonator M.

These metallic needles, the number of which is three (only two of them being visible in FIG. 6), are centered in bores 56 and 57 by means of resilient sleeves 58, for instance of rubber or an analogous material. These flexible sleeves 58 have a double function:

on the one hand, they permit a correct relative positioning of transmitter resonator E and measurement resonator M with respect to each other, corresponding to a correct acoustic coupling (every needle 55 has its two ends in intimate contact with the bottoms of the corresponding bores 56 and 57), and
on the other hand, they prevent the transmission of mechanical vibrations between resonator E and resonator M.

As for the acoustic coupling between measurement resonator M and receiver resonator R it is similar, but with a single metallic needle 59 which is engaged in a bore provided in the cylindrical block constituting the receiver resonator R. But, in order to permit an acoustic scanning of the measurement resonator M, coupling is effected, at the level of said resonator M, through a lateral contact of metallic needle 59, the position of said lateral contact being adjustable along a generatrix of resonator M.

For this purpose and as shown by FIG. 5, receiver resonator R may be mounted on a movable support 60 controlled by means of a micrometric screw 61.

But it would be possible, when the medium to be studied is transparent, to proceed to an axial acoustic scanning by measurement of the elasticity.

The apparatus according to the present invention may be used:

in connection with revolving machines such as compressors, turbines, fans and the like;
in static installations such as blowers, shock tubes and so on;
in devices mounted on vehicles and in particular on aircraft.

Concerning these applications it should be pointed out that the measurement resonator would consist:

in the case of revolving machines, by the fluid circulating in said machines;
in the case of static installations, by the fluid used for the blower or the shock tube;
in the case of vehicles by the fluid in which the vehicles in question are intended to move.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A measurement apparatus which comprises, in combination:
   an acoustically insulated sample forming a measurement acoustic resonator,
   an acoustic transmitter device,
   means for controlling the frequency of the waves supplied by said transmitter device,
   means for connecting said acoustic transmitter device with one part of said measurement resonator,
   an acoustic receiver device,
   means for connecting said acoustic receiver device with another part of said measurement resonator,
   at least one of said devices comprising a resonator,
   the means for connecting said last mentioned resonator with said measurement resonator consisting of weak coupling means between said two resonators, and means for reading the strength of the signals received by said acoustic receiver.

2. A measurement apparatus which comprises, in combination:
an acoustically insulated sample forming a measurement acoustic resonator,
an acoustic transmitter device comprising an acoustic resonator,
means for controlling the frequency of the waves supplied by said transmitter device,
weak coupling means between said last mentioned resonator and one part of said measurement resonator,
an acoustic receiver device comprising an acoustic resonator,
weak coupling means between said last mentioned resonator and another part of said measurement resonator,
at least one of said coupling means being adjustable,
means for controlling said adjustable means to vary the part of said measurement resonator where the device having adjustable coupling means is coupled with said measurement resonator, and
means for reading the strength of the signals received by said acoustic receiver.

3. A measurement apparatus which comprises, in combination:
an acoustically insulated sample forming a tubular measurement acoustic resonator,
an acoustic transmitter device comprising an acoustic resonator,
means for controlling the frequency of the waves supplied by said transmitter device,
weak coupling means between said last mentioned resonator and one part of said measurement resonator,
an acoustic receiver device comprising an acoustic resonator,
weak coupling means between said last mentioned resonator and another part of said measurement resonator,
the last mentioned coupling means being adjustable,
means for controlling said adjustable means to vary the part of said measurement resonator where the receiver device is coupled with said measurement resonator, and
means for reading the strength of the signals received by said acoustic receiver.

4. An apparatus according to claim 3, wherein the transmitter device comprises:
a tube fixed with respect to said measurement resonator,
a tubular support slidable in said tube, said tubular support having an open end face,
a loud speaker fixed in said open end face,
a thin perforated plate fitted on the output of said loud speaker, and
means for controlling the axial position of said tubular support in said tube.

5. An apparatus according to claim 3 wherein the receiver device comprises:
a tube carried by said measurement resonator,
a tubular support slidable with respect to said tube said tubular support having an open end face,
a microphone fixed in said open end face, and
means for controlling the axial position of said tubular support with respect to said tube.

6. An apparatus according to claim 3 wherein said coupling means between the first and second mentioned resonators consist of a plurality of tubular conduits extending to the inside of said two last mentioned resonators, the total cross section of said tubular conduits being smaller than the cross section of said tubular measurement acoustic resonator.

7. An apparatus according to claim 6 wherein the number of said tubular conduits is three.

8. An apparatus according to claim 6 wherein the middle portion of each of said tubular conduits is flexible.

9. An apparatus according to claim 3 wherein the coupling means between the first and third mentioned resonators consists of a tubular conduit extending to the inside of said two last mentioned resonators the cross section of said tubular conduit being smaller than the cross section of said tubular measurement acoustic resonator.

10. Apparatus according to claim 9 wherein the middle portion of said tubular conduits is flexible.

11. Apparatus according to claim 9 comprising:
a cylinder fixed with respect to said measurement acoustic resonator,
a piston slidable in said cylinder,
said third mentioned resonator and said tubular conduit being fixed on said piston and
means for controlling the position of said piston in said cylinder.

12. An apparatus according to claim 6 wherein the end of each of said tubular conduits located in said second mentioned resonator has a flaring inner wall, with a sharp edge.

13. An apparatus according to claim 9 wherein the end of said tubular conduit located in said measurement resonator has a flaring inner wall, with a sharp edge.

14. An apparatus according to claim 6 wherein the end of each of said tubular conduits located in said second mentioned resonator is closed and of tapering shape, the side wall of the end portion of said tubular conduit located in said second mentioned resonator being provided with a hole.

15. An apparatus according to claim 9 wherein the end of said tubular conduit located in said measurement resonator is closed and of tapering shape, the side wall of the end portion of said tubular conduit located in said measurement resonator being provided with a hole.

16. A measurement apparatus which comprises, in combination:
an acoustically insulated sample forming a measurement acoustic resonator in the form of a cylindrical solid block,
an acoustic transmitter device forming a resonator in the form of a solid block,
means for controlling the frequency of the waves supplied by said transmitter device,
weak coupling means between said last mentioned resonator block and one part of said measurement resonator block,
an acoustic receiver device forming a resonator in the form of a solid block,
weak coupling means between said last mentioned resonator block and another part of said measurement resonator block,
the last mentioned coupling means being adjustable,
means for controlling said adjustable means to vary the part of said measurement resonator block where the receiver is coupled, and
means for reading the strength of the signals received by said acoustic receiver.

17. An apparatus according to claim 16 wherein said first mentioned coupling means comprise a plurality of pointed needles bearing at one end against said first mentioned block and at the other end against second mentioned block.

18. An apparatus according to claim 17 wherein the number of said needles is three.

19. An apparatus according to claim 17 wherein said second mentioned coupling means consist of a pointed needle bearing at one end against said first mentioned block and at the other end against said third mentioned block.

20. An apparatus according to claim 19 wherein said third mentioned block and said needle are both movable as a whole in a direction parallel to the axis of the first mentioned block.

References Cited

UNITED STATES PATENTS

| | | | |
|---|---|---|---|
| 2,283,750 | 5/1942 | Mikelson | 181—.5 |
| 2,521,634 | 9/1950 | Janssen et al. | 73—24 |
| 2,653,471 | 9/1953 | Clewell | 73—24 |

FOREIGN PATENTS 798,323  7/1958  Great Britain.

BENJAMIN A. BORCHELT, *Primary Examiner.*

R. M. SKOLNIK, *Assistant Examiner.*